Jan. 26, 1926. 1,570,975
D. SWEENEY
PROCESS OF CARBONATING MILK OR CREAM
Filed Nov. 11, 1922
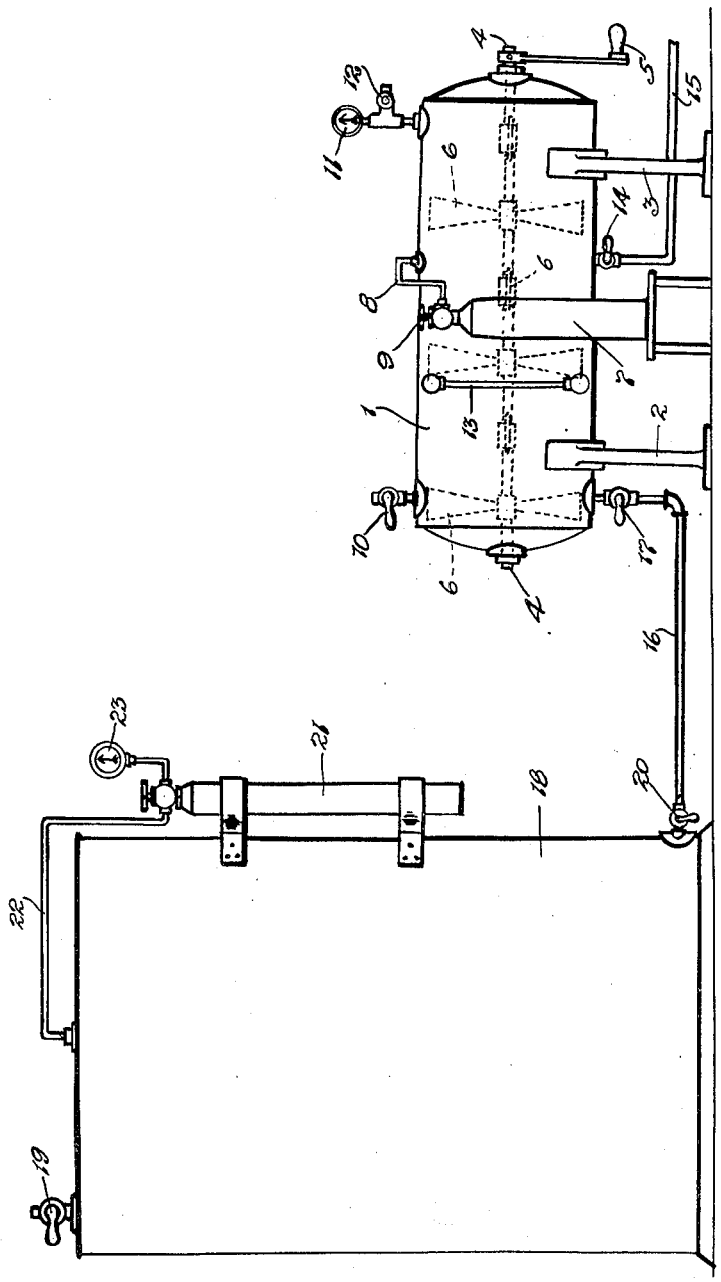
INVENTOR
D. Sweeney
BY
ATTYS Patented Jan. 26, 1926.

1,570,975

UNITED STATES PATENT OFFICE.

DAVID SWEENEY, OF WINNIPEG, MANITOBA, CANADA, ASSIGNOR OF ONE-EIGHTH TO MARGARET McLEOD, ONE-FOURTH TO ALEXANDER C. MacKENZIE, AND ONE-FOURTH TO ROBERT PROSSER ADAMS, ALL OF WINNIPEG, CANADA.

PROCESS OF CARBONATING MILK OR CREAM.

Application filed November 11, 1922. Serial No. 600,464.

*To all whom it may concern:*

Be it known that I, DAVID SWEENEY, of Winnipeg, in the Province of Manitoba, Canada, have invented certain new and useful Processes of Carbonating Milk or Cream, of which the following is the specification.

At the present time liquids such as water, soft drinks and such like are carbonated or aerated by introducing carbonic acid gas into the liquid at considerable pressure and in considerable quantity and violently agitating the liquid to thoroughly carbonate the same. Such a treatment will not effect the carbonating of milk or cream for the reason that the milk or cream will turn sour and the resultant product is not palatable.

According to my invention I am able to produce a very palatable and wholesome drink from milk or cream and the process by which this is obtained is hereinafter described, reference being had to the accompanying drawing in which:

The figure shows a side view of the apparatus utilized in carrying out the process.

Referring now to the drawing:

The tank 1 in which the carbonating is effected is suitably supported by saddles 2 and 3 or other such under structure. A shaft 4 passes centrally through the tank and is provided at one end with an operating handle or crank 5 and within the tank with suitable paddles, mixers, or agitators 6, such construction permitting one to thoroughly mix the material within the tank by turning the crank.

A tube or container 7 for carbonic acid gas ($CO_2$) is provided, the tube being connected by means of a gas pipe 8 to the upper part of the tank and being fitted with the customary controlling valve 9 controlling the supply of gas to the tank.

The tank is fitted with a release valve 10, a pressure gauge 11 and an automatic blow off valve 12 and is supplied also with a sight glass 13, the latter being provided to indicate the height of the liquid in the tank. A drain cock 14 is provided at the bottom of the tank and this communicates with an outlet pipe 15 which leads to a bottling machine not herein shown. An inlet or feed pipe 16 communicates with the bottom of the tank and is provided adjoining the tank with a controlling valve 17.

The milk or cream to be carbonated or aerated is passed to the tank through the pipe 16. The milk will be preferably fed in under pressure, although it can be put in by pouring it into the tank or by a gravity feed.

In the present disclosure I have shown a closed can 18 in which the supply of milk is placed, the can being fitted at the top with a release valve 19 and at the bottom with a drain valve 20, the latter valve communicating with the pipe 16. A tube 21 containing carbonic acid gas is associated with the can and is connected to the top of the can by a gas pipe 22. Obviously, one can maintain a predetermined pressure of gas in the top of the can sufficient to fully expel the milk or cream therefrom through the pipe 16 of the tank. It is necessary in manipulating the tube 21 to initially open the valve 19 to insure of the expulsion of air from the top of the can. As soon as one is satisfied that the air is expelled he closes the valve 19 and fills the upper part of the tank with carbonic acid gas to the required pressure as indicated by the gauge 23 associated with the can. During the aforesaid operation the valve 20 is closed.

In actual practice about ten pounds pressure will be sufficient in the top of the can.

When one is ready to proceed with the carbonating or aerating of the milk or cream he opens the inlet valve 17, taking care that the outlet cock 14 is closed. He then gently opens the valve 20, which permits the milk or cream to flow into the tank until it has reached a predetermined level, as indicated on the sight glass. The milk being introduced, one closes the valves 20 and 17 and opens the release valve 10. He next gently opens the valve 9, allowing a limited quantity of carbonic acid gas to flow into the tank and expel all atmospheric air therefrom through the valve 10. After one is satisfied that the air is expelled he closes the valve 10 and brings the pressure of the carbonic acid gas up to say five pounds, which will be shown by the gauge 11. This being accomplished, one slowly turns the crank to slowly agitate the milk or cream within the tank and mix the gas with the same. When the gas has become absorbed by the milk the gauge 11 will indicate zero pressure. One then again opens the valve 9 to admit a further charge of carbonic acid gas, care being taken that a low pressure, say five pounds, is maintained, and as indicated by the gauge. This pressure being reached, the valve 9 is again closed and the crank is again slowly turned to slowly agitate the milk; the pressure at the gauge will again drop to zero and a further charge of gas is introduced and therafter the crank is slowly turned.

During the successive introductions of the gas and the successive mixing of the milk there will be a gradual building up of gas pressure in the top of the tank, due to the total non-absorption of the gas by the milk. When, by successive stages of introduction of gas in limited quantities and the slow agitating of the milk subsequent to each introduction there is, say thirty pounds, pressure showing at the gauge the carbonating or aerating of the milk or cream is complete.

One can then open the valve 14 and the carbonated or aerated milk will be forced through the pipe 15 to the bottling machine, not shown, and by the pressure of the gas in the upper part of the tank.

I might remark that in carrying out the process, both in the machine shown and at the bottling machine it is essential that atmospheric air be excluded at all times.

The process hereinbefore described is repeated each time the tank is emptied.

I wish herein to particularly point out the feature that the gas must be introduced into the tank in limited quantities and in successive stages and that the contents of the tank must be slowly agitated or mixed after each introduction of gas until the milk is thoroughly carbonated, as otherwise the milk or cream will turn sour.

What I claim as my invention is:

1. The herein described process of carbonating or aerating milk or cream which consists in introducing the milk or cream into a container, expelling atmospheric air, sealing the container successively charging the container with carbonic acid gas in limited quantities and at a limited pressure without allowing any substantial escape of absorbed carbonic acid gas and slowly agitating the contents of the container after the introduction of each charge of carbonic acid gas.

2. The herein described process of carbonating or aerating milk or cream which consists in introducing the milk or cream to be treated into a container, subsequently expelling atmospheric air and maintaining the same expelled, subsequently charging the container with carbonic acid gas introduced at successive intervals of time, the gas being introduced in limited quantities and brought to a predetermined pressure within the tank and slowing agitating the contents of the container after the introduction of each charge of gas the absorbed carbonic acid gas of each charge being retained so that the gas of the next charge is additive.

3. The herein described process of carbonating or aerating milk or cream which consists in introducing the milk or cream to be carbonized into a closed container but not wholly filling the container, expelling atmospheric air from the top of the container and maintaining it expelled and alternately charging the container with carbonic acid gas and mixing each charge with the milk by agitation, the charge being introduced in a predetermined quantity and at a predetermined pressure and each preceding charge being maintained absorbed so that the succeeding charge is additive.

4. A process of carbonating milk which consists in subjecting the same while free of air, to successive charges of carbonic acid gas slowly agitating the milk after each charging operation retaining the carbonic acid of each charge so that the absorbed carbonic acid of a succeeding charge is additive.

5. A process of carbonating milk which consists in introducing the milk into an air tight container, placing the interior of the container in communication with the atmosphere and introducing a charge of carbonic acid gas to purge the container and milk of atmospheric air, disrupting communication between the container and the atmosphere subsequent to elimination of the air while permitting the carbonic acid charging operation to continue until a predetermined pressure is developed in the container, shutting off the flow of carbonic acid gas upon the development of said predetermined pressure and subjecting the milk to slow and gentle agitation to absorb the gas and repeating the charging and agitating operations in the same sequence without any substantial release of absorbed carbonic acid between the charging and agitating stages until a predetermined pressure is developed in the container.

Signed at Winnipeg, this 31st day of August, 1922.

DAVID SWEENEY.